(12) United States Patent
Valles et al.

(10) Patent No.: US 7,265,671 B1
(45) Date of Patent: Sep. 4, 2007

(54) SAFETY ALARM SYSTEM FOR SEATBELTS

(75) Inventors: Lisa Valles, 866 Elston Dr., Shelbyville, IN (US) 46176; John Stoughton, Indianapolis, IN (US)

(73) Assignee: Lisa Valles, Edinburgh, IN (US)

( * ) Notice: Subject to any disclaimer, the term of this patent is extended or adjusted under 35 U.S.C. 154(b) by 102 days.

(21) Appl. No.: 11/035,202

(22) Filed: Jan. 13, 2005

(51) Int. Cl.
*G08B 13/00* (2006.01)
(52) U.S. Cl. ............ 340/541; 340/309.16; 340/426.23
(58) Field of Classification Search ................ 340/541, 340/457, 426.22, 426.23, 309.16
See application file for complete search history.

(56) References Cited

U.S. PATENT DOCUMENTS

| 4,222,028 | A | | 9/1980 | Danchilla |
| 4,727,358 | A | | 2/1988 | Burt, III |
| 4,755,789 | A | | 7/1988 | Paschal |
| 4,849,733 | A | | 7/1989 | Conigliaro et al. |
| 4,987,403 | A | | 1/1991 | Apfel |
| 5,483,221 | A | | 1/1996 | Mutter et al. |
| 5,760,684 | A | | 6/1998 | Orbach |
| 5,829,782 | A | | 11/1998 | Breed et al. |
| 5,871,063 | A | | 2/1999 | Young |
| 5,901,978 | A | | 5/1999 | Breed et al. |
| 5,949,340 | A | * | 9/1999 | Rossi ......................... 340/457 |
| 6,116,639 | A | | 9/2000 | Breed et al. |
| 6,339,371 | B1 | | 1/2002 | Baggelaar et al. |
| 6,393,133 | B1 | | 5/2002 | Breed et al. |
| 6,412,813 | B1 | | 7/2002 | Breed et al. |
| 6,489,889 | B1 | * | 12/2002 | Smith ......................... 340/457 |
| 6,507,779 | B2 | | 1/2003 | Breed et al. |
| 6,809,640 | B1 | | 10/2004 | Sherman |
| 6,922,147 | B1 | * | 7/2005 | Viksnins et al. ............. 340/457 |
| 6,922,154 | B2 | * | 7/2005 | Kraljic et al. ............. 340/457.4 |
| 6,924,742 | B2 | * | 8/2005 | Mesina ..................... 340/457.1 |
| 2005/0068162 | A1 | * | 3/2005 | Santa Cruz et al. ........ 340/457 |
| 2006/0061201 | A1 | * | 3/2006 | Skinner ...................... 297/468 |

* cited by examiner

*Primary Examiner*—Thomas Mullen
(74) *Attorney, Agent, or Firm*—Daniel L. Boots; David E. Novak; Bingham McHale LLP

(57) ABSTRACT

An alarm system for use with a motor vehicle to sound an alert whenever child passengers are left unattended and belted in a parked motor vehicle, including a transmitter for generating a radio signal characterized by a predetermined frequency, a receiver for receiving and rectifying the radio signal, a sensor for sending an ignition status signal to the receiver if the vehicle ignition is on, a timer for sending an activation signal in response to the receiver receiving the radio message and the ignition status signal, and an alarm for generating an audible signal in response to receipt of the activation signal.

11 Claims, 4 Drawing Sheets

SAFETY ALARM SYSTEM FOR SEATBELTS

TECHNICAL FIELD OF THE INVENTION

This invention relates to safety devices and, more particularly, to an alarm system to alert drivers when a child passenger's seatbelt remains fastened after the automobile is parked and the engine turned off.

BACKGROUND OF THE INVENTION

Unfortunately, a number of infants and small children are inadvertently left buckled in their car seats in parked automobiles. In most of these cases, the drivers are parents or other caretakers who are breaking their normal (usually early morning) routines by taking the child along. The driver, presumably feeling the distracting effects of fatigue, stress, or the like, simply forgets the child is in the car seat and leaves the parked vehicle with the child still inside. The likelihood of this event occurring increases with the presence of other factors, such as if the child is sleeping or otherwise silent, if the child is one of many children and gets 'lost in the shuffle', or the like.

There is thus a need that the driver be reminded of the presence of child passengers in the vehicle who cannot otherwise speak up for themselves. The present invention addresses this need.

SUMMARY OF THE INVENTION

The present invention relates to method and apparatus for generating an alarm signal in the event a child is left belted in a parked vehicle. One object of the present invention is to provide an improved vehicle alarm design. Related objects and advantages of the present invention will be apparent from the following description.

DESCRIPTION OF THE PREFERRED EMBODIMENTS

Figure 1:
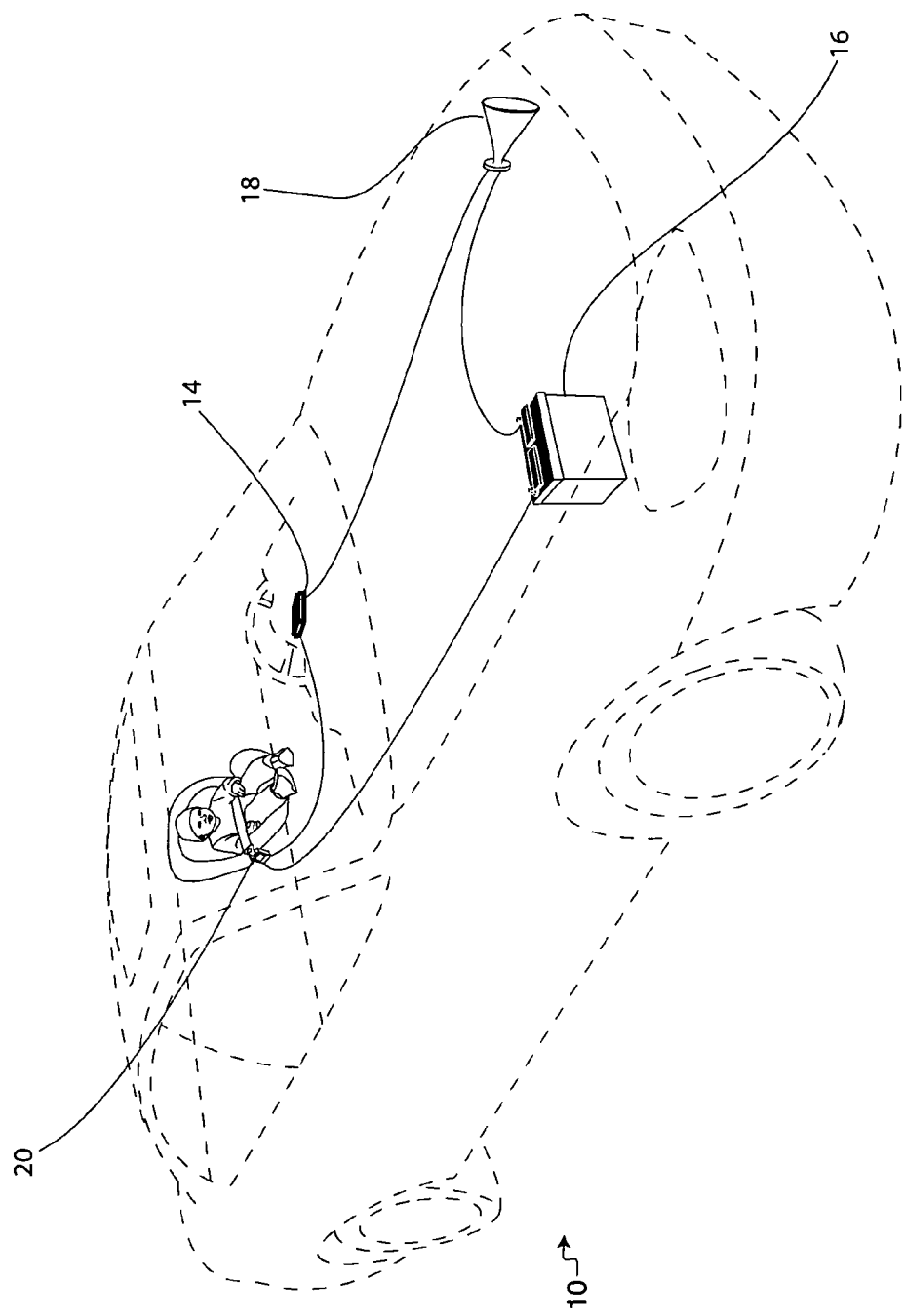
FIG. 1 is a schematic view of a first embodiment of a safety alarm belt assembly of the present invention.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

FIGS. 1-4 relate to a first embodiment of the present invention, a safety alarm system 10 for preventing the accidental leaving of a child passenger in a vehicle, such as an automobile, once the vehicle has been parked and the engine turned off. The safety alarm system 10 generally includes a seat belt sensor assembly 12, a vehicle status sensor assembly 14, a power source or battery 16, and an audible alarm generator or horn 18. The alarm generator 18 is typically the horn of the vehicle, but may also be a key fob, cell phone, vibrating alarm, or the like.

Figure 2:
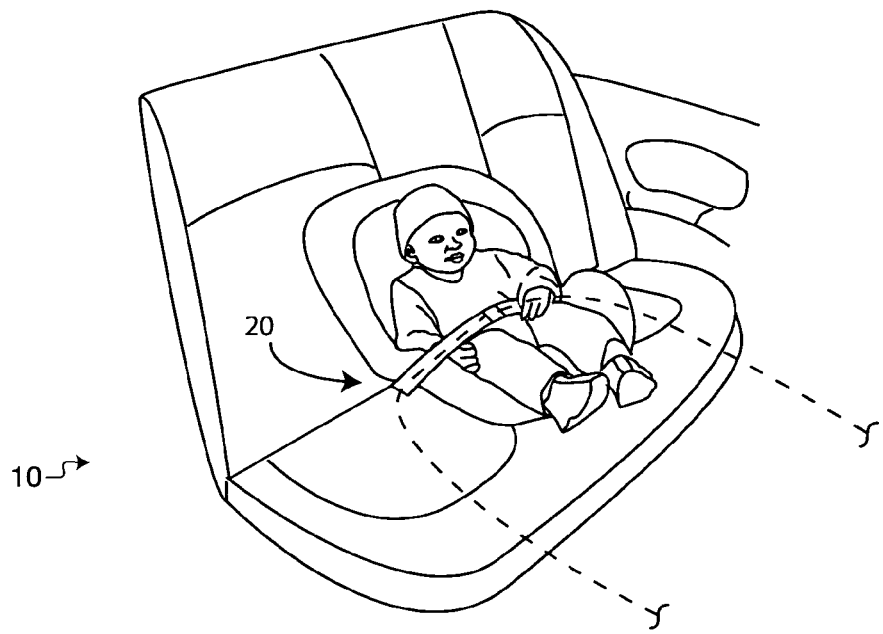
FIG. 2 is an enlarged perspective schematic view of a child passenger engaged in a portion of the assembly of FIG. 1.
Figure 3A:
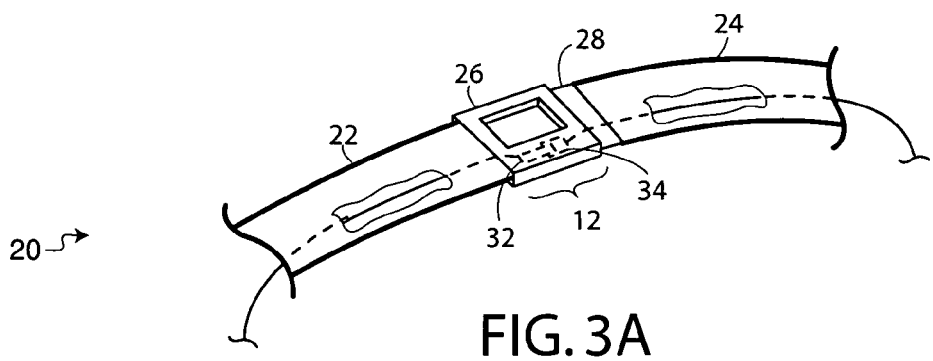
FIG. 3A is an enlarged partial perspective schematic view of the belt portion of the assembly if FIG. 1 with the buckle portions engaged.
Figure 3B:
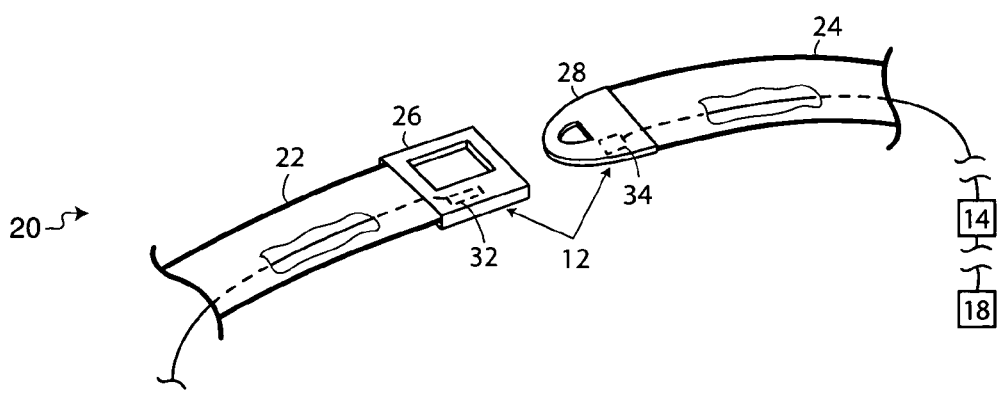
FIG. 3B is an enlarged partial perspective schematic view of the belt portion of the assembly if FIG. 1 with the buckle portions disengaged.

As shown schematically in FIGS. 1 and 2, the safety alarm system 10 includes a seat belt status sensor assembly 12 connected to a seat belt 20 to be worn by a child passenger. The seat belt 20 typically includes a first belt portion 22 and a second belt portion 24. More typically, as shown in detail in FIGS. 3A and 3B, a first buckle portion 26 is connected to the first belt portion 22 and a second buckle portion 28 is connected to the second belt portion 24. The sensor assembly 12 is typically operative to generate a first signal when the seat belt 20 is fastened (i.e., the buckle portions 26, 28 are engaged with each other) and a second signal when the seat belt 12 is unfastened (i.e., the buckle portions 26, 28 are disengaged from each other).

Referring again to FIGS. 3A and 3B, the sensor assembly 12 includes status signal generator 32 coupled to one seat belt buckle portion 26, 28 and a receiver 34 coupled to the other seat belt buckle portion 28, 26 such that a short range signal generated by the signal generator 32 may be detected by the receiver 34 when the seatbelt 12 is latched. The signal generator 32 and receiver 34 are connected in electric communication with the power source 16; the receiver 34 is likewise in electric communication with the horn 18. The system 10 further includes an engine status sensor assembly 14 operationally connected to the vehicle's engine or ignition for providing a first engine status signal when the engine is running and a second engine status signal when the engine is turned off. The first and second engine status signals may both be positive signals, or one may be a null signal.

Figure 4:
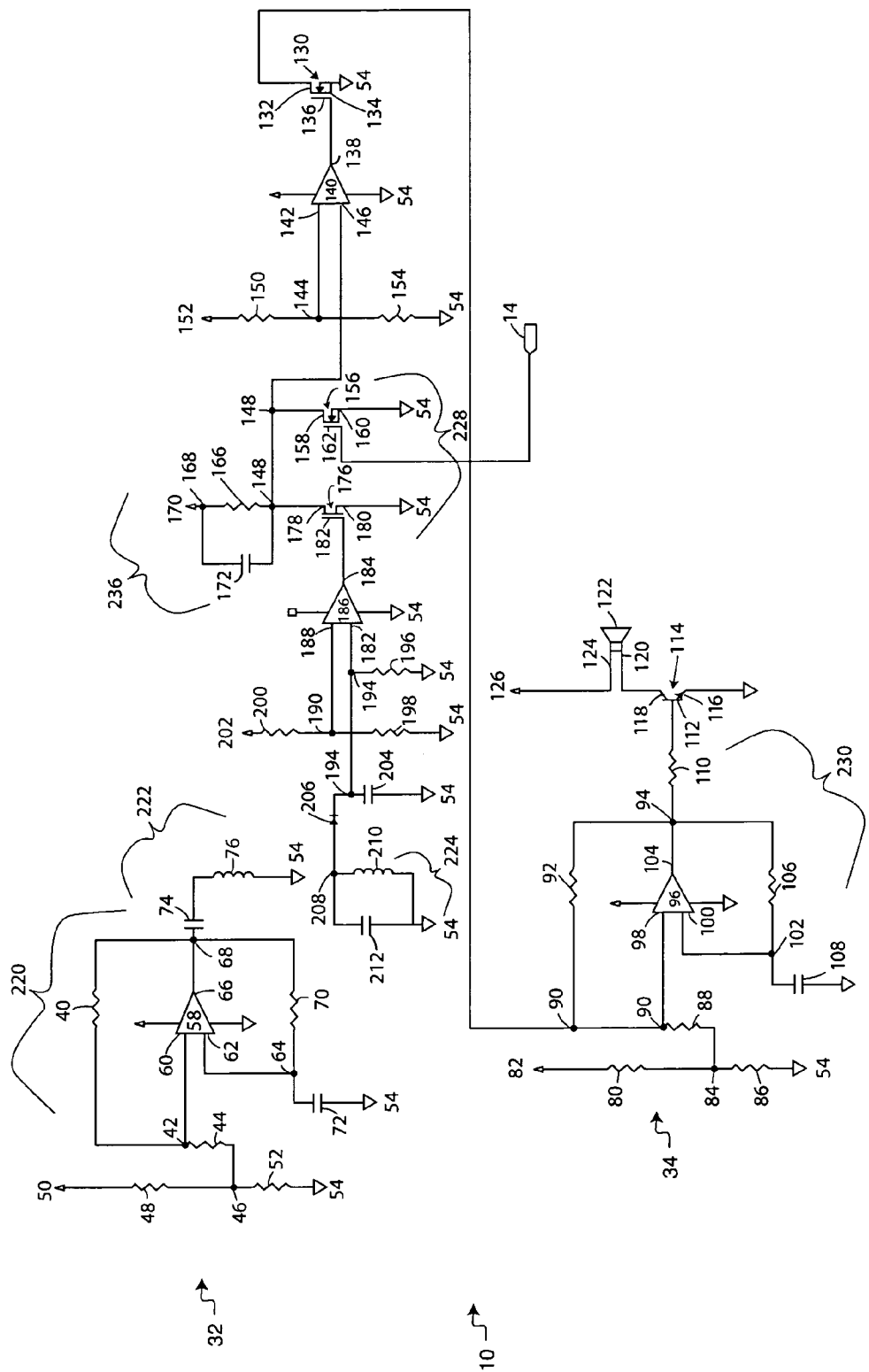
FIG. 4 is a schematic diagram of a first embodiment analog circuit usable with the embodiment of FIG. 1.

Referring to FIG. 4, one possible circuit diagram for a first embodiment alarm system 10 of the present invention is shown in detail. The circuit diagram includes two (2) subassemblies—a signal generator/transmitter subassembly 32 and a receiver/alarm subassembly 34. The signal generator/transmitter subassembly 32 includes a first resistor 40 electrically connected to a first node 42. A second resistor 44 is electrically connected between the first node 42 and a second node 46. A third resistor 48 is electrically connected between the second node 46 and a first voltage source 50. A fourth resistor 52 is electrically connected between the second node 46 and a ground potential 54. A first operational amplifier (op amp) 58 is provided having a noninverting input 60 electrically connected to the first node 42, an inverting input 62 electrically connected to a third node 64 and an output 66 electrically connected to a fourth node 68. A fifth resistor 70 is electrically connected between the third node 64 and the fourth node 68. A first capacitor 72 is electrically connected between the third node 64 and ground 54. A second capacitor 74 is electrically connected between the fourth node 68 and a first inductor 76; the first inductor is electrically connected between the second capacitor 74 and ground 54.

The receiver/alarm subassembly 34 includes a sixth resistor 80 electrically connected between a second voltage source 82 and a fifth node 84. A seventh resistor 86 is electrically connected between the fifth node 84 and ground 54. An eighth resistor 88 is electrically connected between the fifth node and a sixth node 90. A ninth resistor 92 is electrically connected between the sixth node 90 and a seventh node 94. A second op amp 96 is provided having a noninverting input 98 electrically connected to the sixth node 90, an inverting input 100 electrically connected to an eighth node 102 and an output 104 electrically connected to the seventh node 94. A tenth resistor 106 is electrically connected between the seventh node 94 and the eighth node 102. A third capacitor 108 is electrically connected between the eighth node 102 and ground 54. An eleventh resistor 110 is electrically connected between the seventh node 94 and the base 112 of a first transistor 114. The transistor further includes an emitter 116 electrically connected to ground 54 and a collector 118 electrically connected to one terminal 120 of a speaker 122. The speaker 122 includes a second terminal 124 electrically connected to a third voltage source 126.

A second transistor 130 is provided, and includes a drain 132 electrically connected to the sixth node 90, a source 134 electrically connected to ground 54, and a gate 136 electrically connected to the output 138 of a third op amp 140. The third op amp 140 also includes a noninverting input 142 electrically connected to a ninth node 144 and an inverting input 146 electrically connected to a tenth node 148. A twelfth resistor 150 is electrically connected between the ninth node 144 and a fourth voltage source 152. A thirteenth resistor 154 is electrically connected between the ninth node 144 and ground 54. A third transistor 156 is provided having a drain 158 electrically connected to the tenth node 148, a source 160 electrically connected to ground 54, and a gate 162 electrically connected to the vehicle ignition sensor assembly 14.

A fourteenth resistor 166 is electrically connected between the tenth node 148 and an eleventh node 168; a fifth voltage source 170 is electrically connected to the eleventh node 168. A fourth capacitor 172 is electrically connected between the tenth and eleventh nodes 148, 168. A fourth transistor 176 is provided, and includes a drain 178 electrically connected to the tenth node 148, a source 180 electrically connected to ground 54, and a gate 182 electrically connected to the output 184 of a fourth op amp 186. The fourth op amp 186 further includes a noninverting input 188 electrically connected to a twelfth node 190 and an inverting input 192 electrically connected to a thirteenth node 194. A fifteenth resistor 196 is electrically connected between the thirteenth node 194 and ground 54. A sixteenth resistor 198 is electrically connected between the twelfth node 190 and ground 54. A seventeenth resistor 200 is electrically connected between the twelfth node 190 and a sixth voltage source 202. A fifth capacitor 204 is electrically connected between the thirteenth node 194 and ground 54. A first rectifying diode 206 is electrically connected between the thirteenth node 194 and a fourteenth node 208 and is oriented to allow current to flow from the fourteenth node 208 to the thirteenth node 194. A second inductor 210 is electrically connected between the fourteenth node 208 and ground 54 and a sixth capacitor 212 is electrically connected between the fourteenth node 208 and ground 54.

In operation, the seat belt sensor assembly 12 operates to generate a "seatbelt fastened" signal when the seatbelt 20 is buckled (i.e., when the buckle portions 26, 28 are engaged) and the vehicle status sensor assembly 14 operates to send a "vehicle off" signal when the vehicle is turned off or deactivated (such as when the motor is not running or when the ignition is off). When these two conditions coincide for a predetermined amount of time, the audible alarm generator 18 is actuated. The alarm generator 18 is deactuated when either the vehicle is restarted or the seatbelt 20 is unfastened. Thus, when a child passenger is left in a (presumably) parked and deactivated vehicle for more than a predetermined amount of time, the alarm 18 will sound to signal for help.

More specifically, the first embodiment of the present invention includes the signal generator/transmitter subassembly 32 which typically functions as a low power oscillator and transmitter antenna combination that creates and transmits an electromagnetic field that the receiver 34 can sense when the seatbelt 20 is latched (i.e., when the buckle portions 26, 28 are sufficiently near one another for the signal to be received). This can be the seatbelt 20 from the baby seat, a booster seat, the automobile's OEM seatbelt system, or the like. As stated above, the field generator subassembly 32 is typically located in one portion 26, 28 of the seat belt latch or buckle and the receiver subassembly 34 is typically located the other portion 28, 26 of the seat belt latch or buckle. The electromagnetic field generator 32 consists of an oscillator sub-circuit 220 (i.e., the op amp 58 and its surrounding components) and the first resonant tank 222 (i.e., the capacitor 74/inductor 76 pair). The oscillator circuit 220 couples to the first resonant tank 222 and generates a magnetic field at the resonant frequency determined by the values chosen for the capacitor 74 and the inductor 76 elements. This resonant tank 222 is tuned to the frequency of the oscillator ($F_{osc}$) according to the relation $$F_{osc} = 1/\sqrt{L1C1}$$

where L1 is the inductance of inductor 76 and C1 is the capacitance of capacitor 74. The second inductor 210 and the sixth capacitor 212 pair to form a parallel resonant tank 224 that may receive the electromagnetic field generated by the signal generator 32 when in reasonable proximity thereto. Reception of the signal from the generator 32 by the receiver 34 is taken to mean the belt 20 remains latched and, by extension, the child passenger is taken to still remain in the vehicle (although the signal may be received if the buckle portions 26, 28 are unlatched but in close proximity to one another, a false positive reading so generated errs on the side of child safety). The electromagnetic field from the generator subassembly 32 diminishes in intensity in proportion to the third power of distance. As both tanks 222, 224 are in tune with one another (typically to the frequency of the oscillator 220), such tuning (in conjunction with the strong signal dependence on proximity) minimizes the possibility of false triggering (that is the alarm going off when the buckle portions 26, 28 are not coupled).

The first diode 206 and the capacitor 204 operate together to rectify the AC ($F_{osc}$) waveform from the receiving antenna (i.e., inductor 210). The voltage of the rectified waveform is compared to a fixed reference voltage generated by the voltage divider defined by resistors 198 and 200. If the rectified signal received by the receiver subassembly 32 has a higher voltage than the reference voltage (this is the condition when the belt 20 is buckled), then the comparator 140 output is low (and the belt 20 is assumed to be latched). Transistors 156 and 176 operate together to represent the alarm logic assembly 228. If either gate 162, 182 is high, the shared drain load resistor 166 is pulled low (that is the respective drains 158, 178 are pulled essentially to ground potential 54). On the other hand, both gates 162, 182 need to be low for the drains 158, 178 to be held at Vcc 170 (both transistors 156, 176 off). On the transition between these states, the node 148 that the drains 158, 178 share drifts from ground 54 to Vcc 170 at a rate determined by circuit elements resistor 166 and capacitor 172 operating together. This transition begins when the output of op amp 140 is low (this means the belt 20 is still connected) and the signal from the ignition 14 is low (this means the vehicle's ignition 14 is off).

When those conditions are met, the voltage at the drains 158, 178 rises according to the following equation:

$$V142 = Vcc(1 - e^{-t/R166C172})$$

When this voltage ($V_{142}$ is defined as the voltage on the noninverting input 142 of op amp 140) exceeds that of the voltage divider element (defined by resistors 150 and 154), op amp 140 changes state by switching its output from high to low. This turns on the oscillator formed by op amp 96 and its surrounding circuitry (designated oscillator 230). The oscillation frequency of oscillator 230 is in the audible range and is fed to the speaker/horn/sound generator 18 by the current amplifier element 114.

Circuit elements resistor 166 and capacitor 172, in conjunction with resistors 150 and 154, operate together to define a timer 236. The values of the timer 236 circuit elements resistor 166 and capacitor 172 (as well as the values of resistors 150 and 154) determine the predetermined time interval that must elapse before the alarm sounds and may be chosen to have the alarm go off any time between seconds and tens of minutes after the alarm condition is met (i.e., the ignition 14 is off and buckle portions 26, 28 of the passenger seat belt 20 remain connected). Changing either condition (ignition 14 on or belt portions 26, 28 disconnected) resets the timer 236 such that the full timer interval will have to pass after the trigger event for the alarm to go off. Restoration of the ignition 14 (car on) or unlatching the belt 20 resets the alarm.

Figure 5:
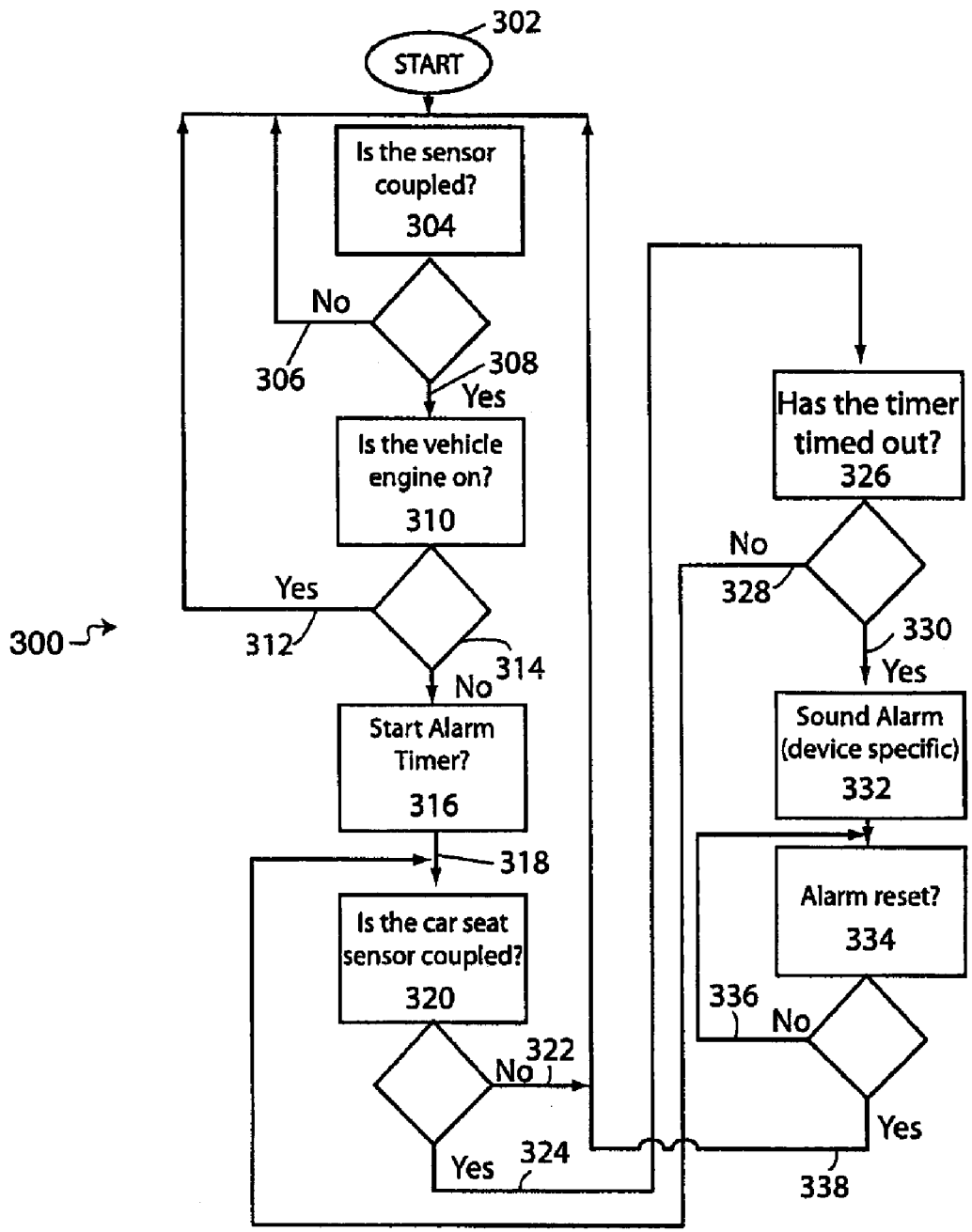
FIG. 5 is a flow chart diagram of the logic of a second embodiment digital circuit usable with the embodiment of FIG. 1.

FIG. 5 relates to a second embodiment circuit of the present invention, a flow diagram relating to the logic for a digital control circuit 300. The logic flows as follows: the program is initiated by a start 302 event, such as activation of a microprocessor or energizing the circuit. The circuit first queries 304 whether or not the seat belt buckle portions 22, 24 are coupled, i.e., whether the receiver 34 is receiving a first signal from the signal generator/transmitter 32. If no 306 (i.e., the first signal is no longer received), the logic returns to repeat the first query 304. If yes 308, the circuit performs a second query 310 to determine whether the vehicle engine is on, i.e., whether a first status signal is being received from the vehicle sensor assembly 14. If yes 312, the logic returns to repeat the first query 304. If no 314, the logic proceeds to initiate the alarm timer 316, which is set to generate an elapsed time signal 318 after a predetermined period of time has elapsed. The logic next generates a third query 320 to determine if the seat belt buckle portions 22, 24 remain coupled, i.e., whether the receiver 34 is still receiving a first signal from the signal generator/transmitter 32. If no 322 (i.e., the first signal is no longer received), the logic returns to repeat the first query 304. If yes 324, the logic generates a fourth query 326 to check whether the timer has timed out (i.e., whether the timer 316 has completed its count sequence and an elapsed time signal 318 has been generated). If no 328, the logic returns to repeat the third query 320. If yes, 330, the logic generates an actuation signal 332 to the alarm device 18. The logic then proceeds to generate a fifth query 334 to determine whether the alarm system 10 was reset. If no 336, the logic returns to the fifth query 334. If yes 338, the logic returns to the first query 304.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected

What is claimed is:

1. A safety alarm system for alerting a driver to the presence of seat-belted passengers remaining in a parked vehicle, comprising:
   a vehicle status sensor;
   a seatbelt having a first seatbelt portion and a second seatbelt portion;
   a transmitter subassembly connected to the first seatbelt portion and configured to send a transmitter signal; and
   a receiver subassembly connected to the second seatbelt portion and operationally coupled to the transmitter subassembly; and
   a sound generator in electric communication with the receiver subassembly;
   wherein the vehicle status sensor generates a first ignition sensor signal when the vehicle is on;
   wherein the vehicle status sensor generates a second ignition sensor signal when the vehicle is off;
   wherein reception by the receiver subassembly of the transmitter signal from the transmitter subassembly and the second signal from the vehicle status sensor actuates the sound generator;
   wherein the vehicle status sensor is operationally connected to the vehicle motor and in electric communication with the receiver subassembly.

2. The alarm system of claim 1 wherein termination of the transmitter signal from the transmitter subassembly deactuates the sound generator and wherein reception of the first signal by the receiver subassembly deactuates the sound generator.

3. The alarm system of claim 1 wherein the receiver subassembly further comprises a timer in electric communication with the receiver subassembly and the sound generator; wherein reception by the receiver subassembly of the transmitter signal and the second sensor signal actuates the timer; and wherein the timer actuates the sound generator after a predetermined amount of time has elapsed.

4. The alarm system of claim 3 wherein the timer is reset by cessation of the transmitter signal and wherein the timer is reset by reception of the first sensor signal by the receiver subassembly.

5. The alarm system of claim 1 wherein the transmitter subassembly further comprises:
   a first oscillator; and
   a first resonant tank in electric communication with the first oscillator; and
   wherein the receiver subassembly further comprises:

a receiver antenna;
a second resonant tank in electric communication with the receiver antenna;
a rectifier in electric communication with the second resonant tank;
a voltage comparator in electric communication with rectifier;
an alarm logic assembly in electric communication with the voltage comparator; and
a second oscillator in electric communication with the alarm logic assembly;
wherein the vehicle status sensor is operationally connected to the vehicle motor and is in electric communication with the alarm logic assembly.

6. A transceiver alarm system for sounding an audible alarm if a child is left unattended and belted in a parked vehicle, comprising in combination:
a signal transmitter subassembly; and
a receiver subassembly;
wherein the signal transmitter subassembly further comprises:
a first node;
a second node;
a first resistor electrically connected to the first node;
a second resistor is electrically connected between the first node and the second node;
a first voltage source;
a third resistor electrically connected between the second node and the first voltage source;
a fourth resistor electrically connected between the second node and ground potential;
a third node;
a fourth node;
a first operational amplifier having a noninverting input electrically connected to the first node, an inverting input electrically connected to the third node and an output electrically connected to the fourth node;
a fifth resistor electrically connected between the third node and the fourth node;
a first capacitor electrically connected between the third node and ground potential;
a first inductor;
a second capacitor electrically connected between the fourth node and the first inductor;
wherein the first inductor is electrically connected between the second capacitor and ground;
wherein the receiver subassembly further comprises:
a fifth node;
a second voltage source;
a sixth resistor electrically connected between the second voltage source and the fifth node;
a seventh resistor electrically connected between the fifth node and ground;
a sixth node;
an eighth resistor electrically connected between the fifth node and the sixth node;
a seventh node;
a ninth resistor electrically connected between the sixth node and the seventh node;
an eighth node;
a second operational amplifier having a second noninverting input electrically connected to the sixth node, an second inverting input electrically connected to the eighth node and a second output electrically connected to the seventh node;
a tenth resistor electrically connected between the seventh node and the eighth node;
a third capacitor electrically connected between the eighth node and ground;
a first transistor having an first emitter electrically connected to ground, a first base, and a first collector;
an eleventh resistor electrically connected between the seventh node and the first base;
a sound generator having a first speaker terminal electrically connected to the first collector and a second speaker terminal;
a third voltage source electrically connected to the second speaker terminal;
a second transistor having a second drain electrically connected to the sixth node, a second source electrically connected to ground, and a second gate;
a ninth node;
a tenth node;
a third operational amplifier having a noninverting input electrically connected to the ninth node, an inverting input electrically connected to the tenth node and a third output electrically connected to the second gate;
a fourth voltage source;
a twelfth resistor electrically connected between the ninth node and the fourth voltage source;
a thirteenth resistor electrically connected between the ninth node and ground;
a vehicle ignition sensor operationally connected to the vehicle ignition;
a third transistor having a third drain electrically connected to the tenth node, a third source electrically connected to ground, and a third gate electrically connected to the vehicle ignition sensor;
an eleventh node;
a fourteenth resistor electrically connected between the tenth node and the eleventh node;
a fifth voltage source is electrically connected to the eleventh node;
a fourth capacitor is electrically connected between the tenth and eleventh nodes;
a fourth transistor having a fourth drain electrically connected to the tenth node, a fourth source electrically connected to ground, and a fourth gate;
a twelfth node;
a thirteenth node;
a fourth operational amplifier having a fourth output electrically connected to the fourth gate, a fourth noninverting input electrically connected to the twelfth node, and a fourth inverting input electrically connected to the thirteenth node;
a fifteenth resistor electrically connected between the thirteenth node and ground;
a sixteenth resistor electrically connected between the twelfth node and ground;
a sixth voltage source;
a seventeenth resistor electrically connected between the twelfth node and the sixth voltage source;
a fifth capacitor electrically connected between the thirteenth node and ground;
a fourteenth node;
a first rectifying diode electrically connected between the thirteenth node and the fourteenth node;
a second inductor electrically connected between the fourteenth node and ground; and
a sixth capacitor electrically connected between the fourteenth node and ground;

wherein the first rectifying diode is oriented for current to flow from the fourteenth node to the thirteenth node.

7. The alarm system of claim 6 further comprising:
a first seatbelt portion; and
a second seatbelt portion configured to interlock with the first seatbelt portion;
wherein the transmitter subassembly is coupled to the first seatbelt portion; and
wherein the receiver subassembly is coupled to the second seatbelt portion.

8. The alarm system of claim 6 wherein the vehicle ignition sensor generates a first ignition sensor signal when the vehicle is on; wherein the vehicle ignition sensor generates a second ignition sensor signal when the vehicle is off; wherein reception by the receiver subassembly of a signal from the transmitter subassembly and the second ignition sensor signal from the ignition sensor actuates the sound generator; wherein the vehicle ignition sensor is operationally connected to a vehicle motor; and wherein the vehicle ignition sensor is connected in electric communication with the receiver subassembly.

9. A transceiver alarm assembly for signaling that a child has been left unattended and belted in a parked vehicle comprising in combination:
a vehicle ignition;
a transmitter for sending a radio signal characterized by a predetermined frequency;
a receiver for receiving and amplifying the radio signal;
an ignition sensor operationally coupled between the vehicle ignition and the receiver and adapted to send an ignition signal to the receiver when the ignition is off;
a sound generator operationally coupled to the receiver;
a receiver power source operationally coupled to the receiver;
a first seatbelt portion; and
a second seatbelt portion configured to interlock with the first seatbelt portion;
wherein the receiver includes a timer actuated by receipt of the ignition signal and the radio signal to send a timer signal after the passage of a predetermined span of time;
wherein the timer is deactuated by cessation of the ignition signal;
wherein the timer is deactuated by cessation of the radio signal;
wherein the timer signal actuates the sound generator;
wherein the transmitter is coupled to the first seatbelt portion; and
wherein the receiver is coupled to the second seatbelt portion.

10. A vehicle alert system, comprising in combination:
transmitter means for generating a radio signal characterized by a predetermined frequency;
receiver means for receiving and rectifying the radio signal;
sensor means for sending an ignition status signal to the receiver means if the vehicle ignition is off;
timer means for sending an activation signal in response to the receiver means receiving the radio signal and the ignition status signal; and
alarm means for generating an audible signal in response to receipt of the activation signal;
wherein the transmitter means includes a first oscillator and a first resonant tank in electric communication with the first oscillator.

11. The alert system of claim 10 further including a first seatbelt portion and a second seatbelt portion; wherein the transmitter means is coupled to the first seatbelt portion; and wherein the receiver means is coupled to the second seatbelt portion.

* * * * *